(12) United States Patent
Jaeger

(10) Patent No.: US 7,299,416 B2
(45) Date of Patent: Nov. 20, 2007

(54) METRO FOR CREATING AND USING LINEAR TIME LINE AND PLAY RECTANGLE

(76) Inventor: Denny Jaeger, 6120 Valley View Rd., Oakland, CA (US) 94611

(*) Notice: Subject to any disclaimer, the term of this patent is extended or adjusted under 35 U.S.C. 154(b) by 756 days.

(21) Appl. No.: 10/635,747

(22) Filed: Aug. 5, 2003

(65) Prior Publication Data

US 2004/0027371 A1    Feb. 12, 2004

Related U.S. Application Data

(63) Continuation-in-part of application No. 09/880,397, filed on Jun. 12, 2001, now Pat. No. 6,883,145, which is a continuation-in-part of application No. 09/785,049, filed on Feb. 15, 2001.

(51) Int. Cl.
    *G06F 3/00* (2006.01)
(52) U.S. Cl. .................. 715/716; 715/719; 715/723; 715/765

(58) Field of Classification Search ............... 715/716, 715/723, 719, 765
    See application file for complete search history.

(56) References Cited

U.S. PATENT DOCUMENTS

| | | | |
|---|---|---|---|
| 5,717,869 A * | 2/1998 | Moran et al. | 715/716 |
| 6,538,665 B2 * | 3/2003 | Crow et al. | 715/723 |

* cited by examiner

*Primary Examiner*—Tadesse Hailu
*Assistant Examiner*—Michael Roswell
(74) *Attorney, Agent, or Firm*—Harris Zimmerman

(57) ABSTRACT

Methods and controls for playing media include a Blackspace Timeline (BTL), and the Play Rectangle (PR). Both of these structures exist as graphic objects and they permit users to both navigate and operate (e.g., edit, scrub, assemble, combine, etc.) media without the use of external tools, e.g., a zoom tool, a play cursor, which must be entered as a separate mode, etc. Media objects are dragged to the timeline, which is rescalable, and re-ranged by click and drag techniques. BTL and PR may function as a time scale device, or as a length measurement device.

10 Claims, 18 Drawing Sheets

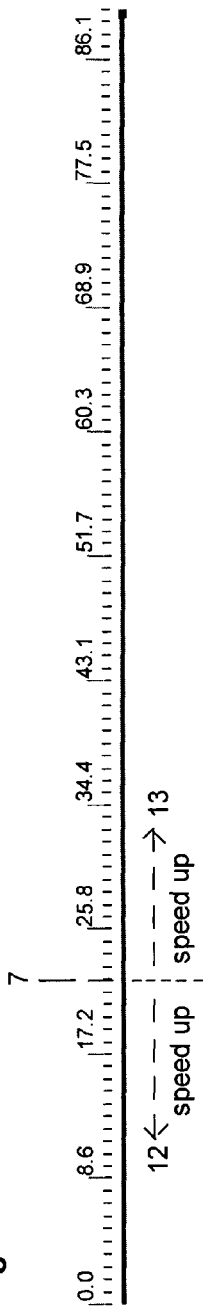
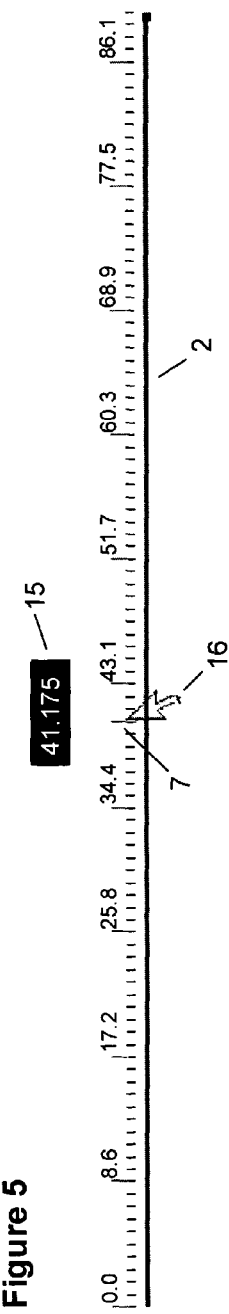
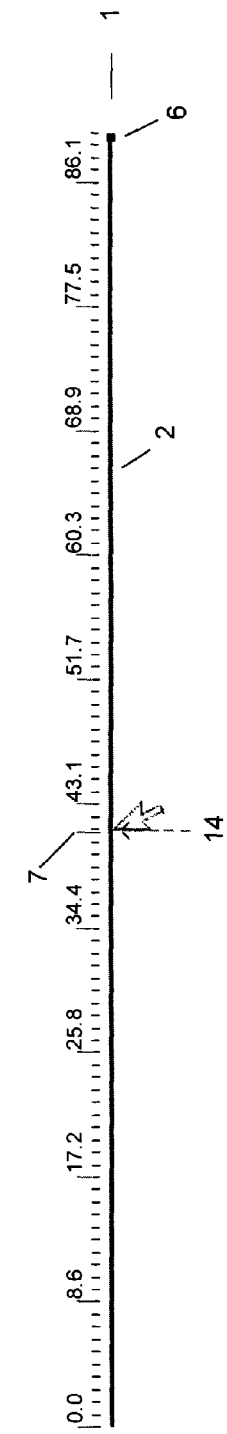
Figure 4
Figure 5
Figure 6

Figure 17: Getting a playbar
method 1 - drag and drop
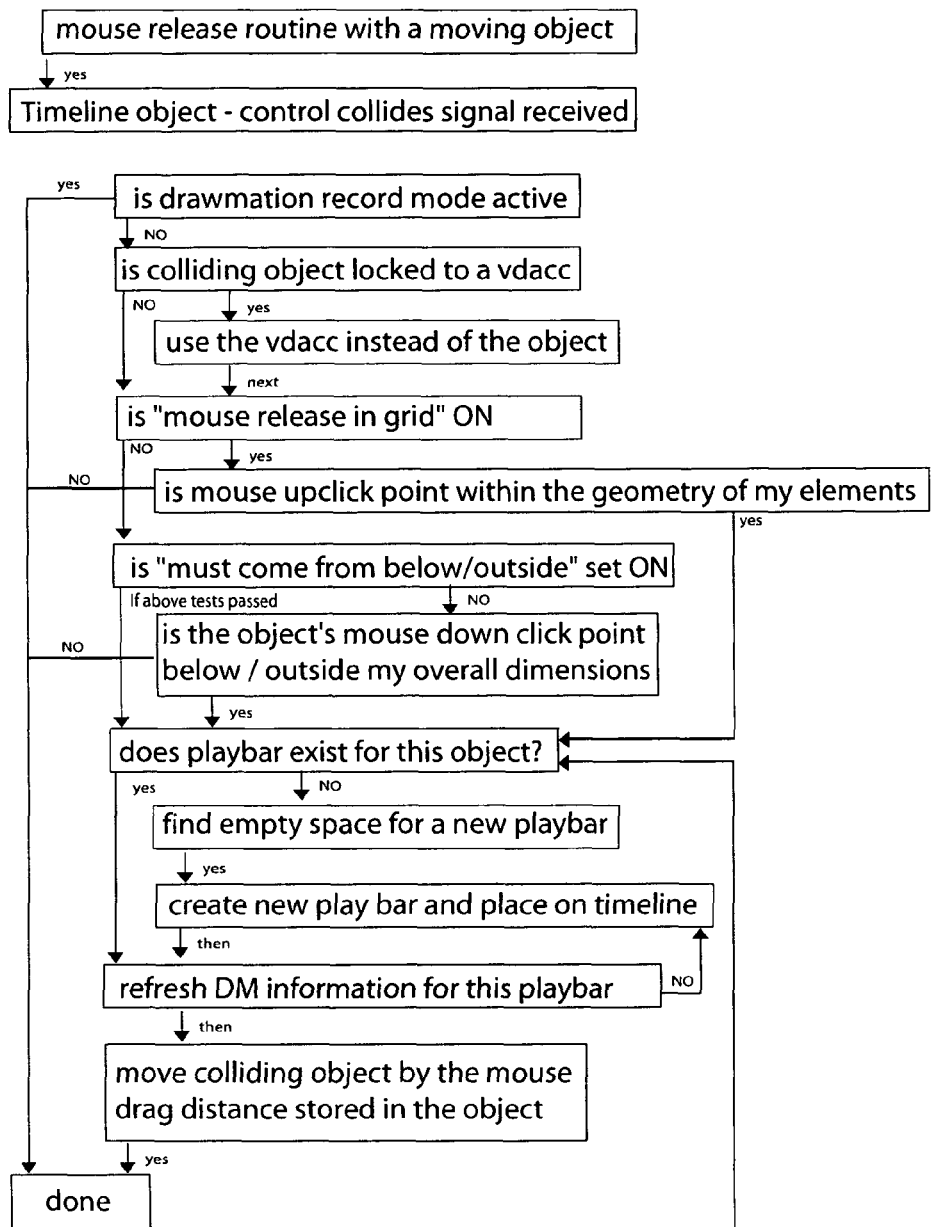
method 2 - Using the info canvas
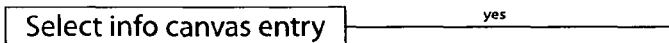

Figure 18: Getting Drawmation Information for a playbar
To refresh the segments on a playbar
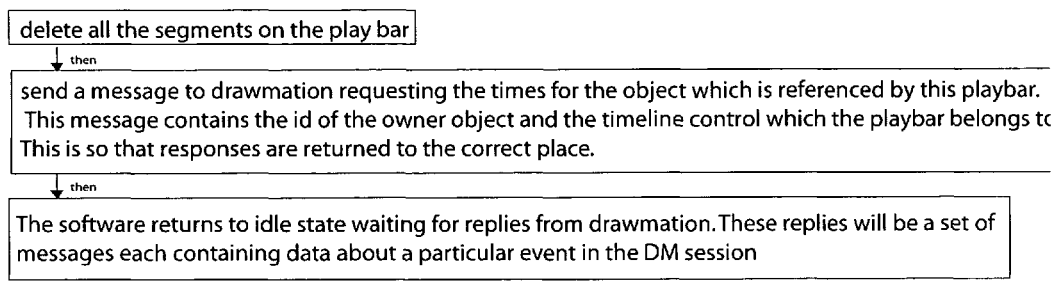
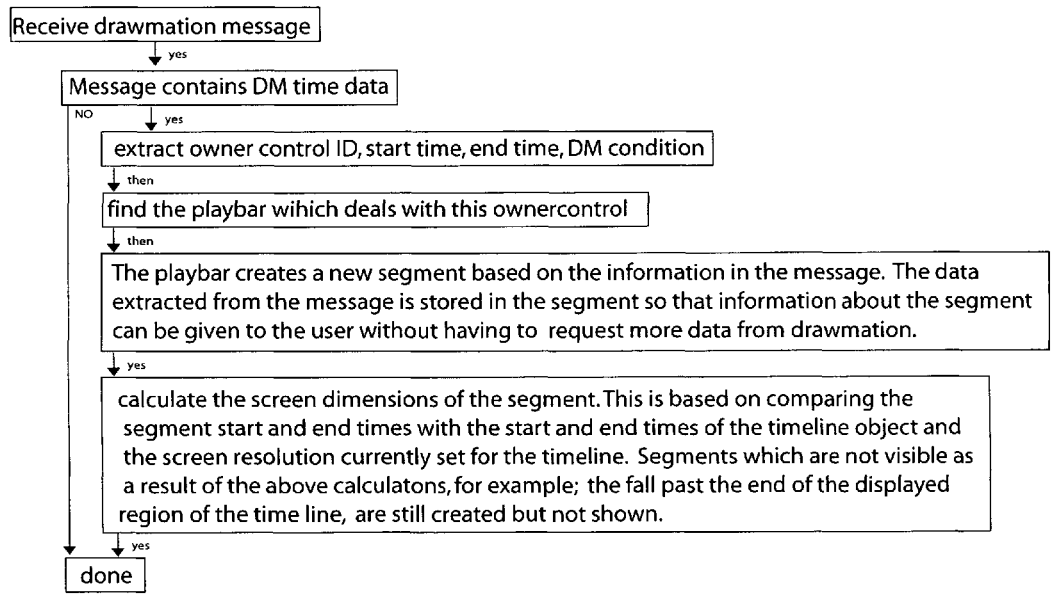

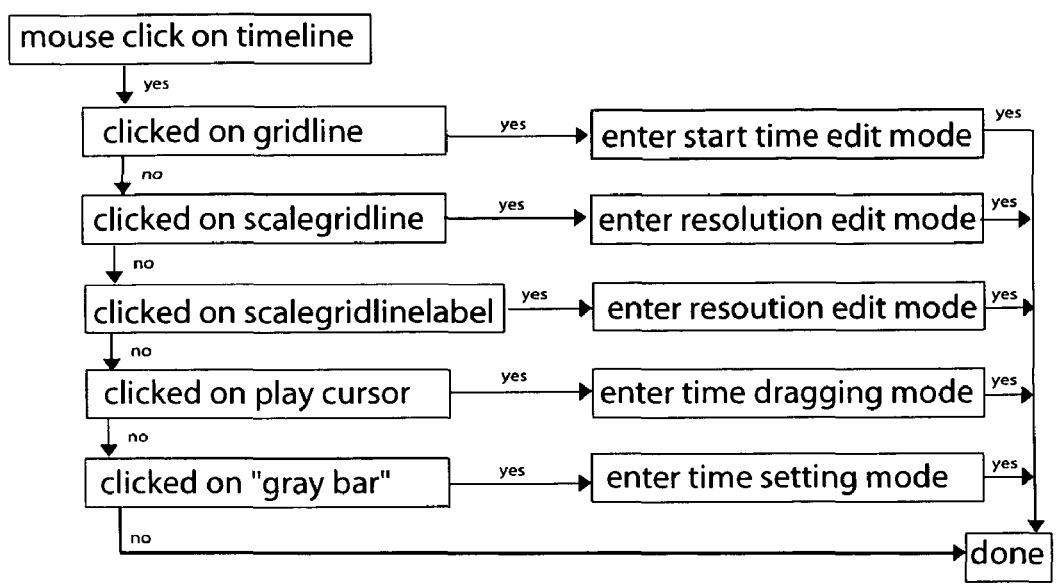
Figure 19: Configuring the timeline display using the mouse

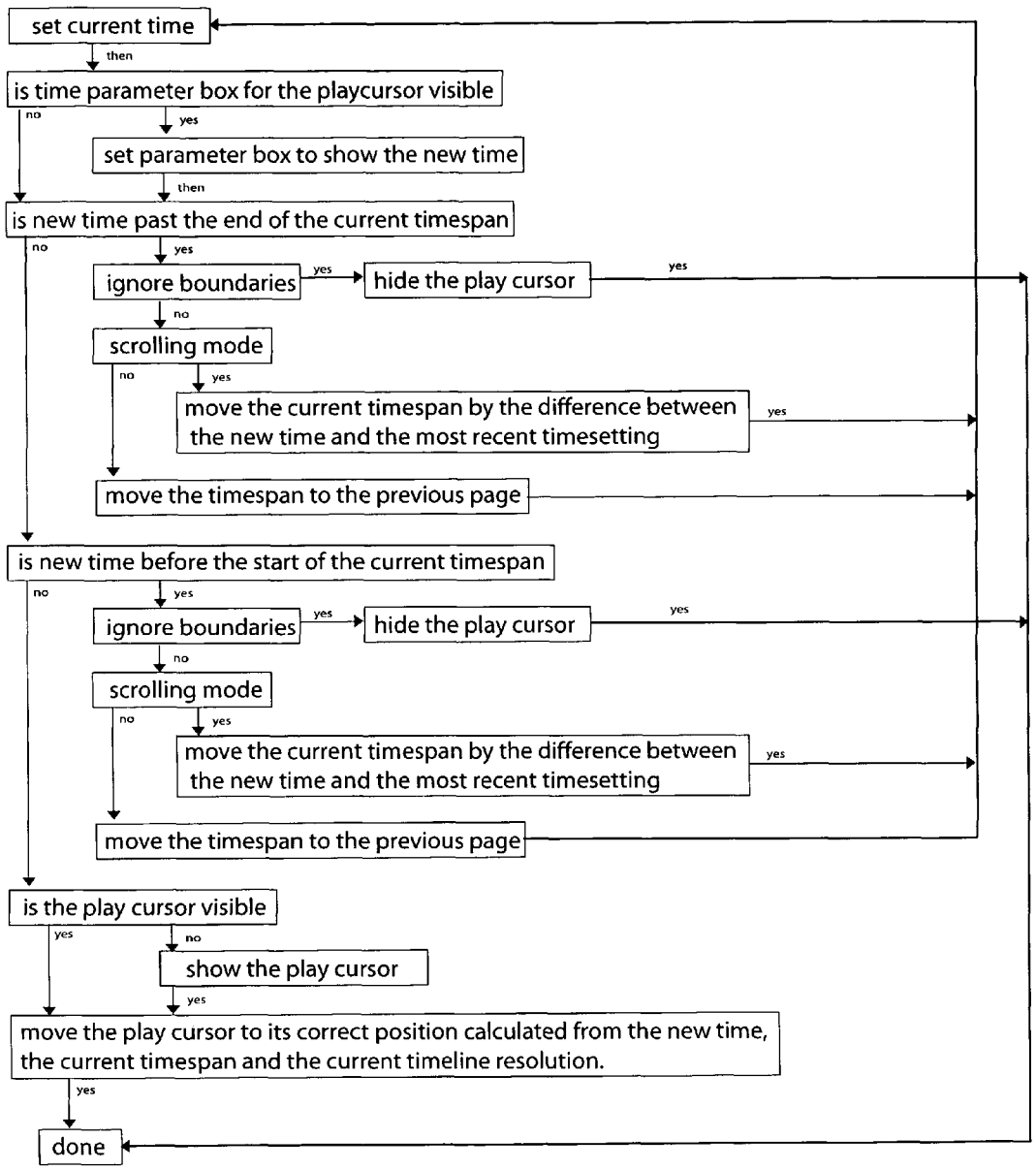
Figure 22: Setting the time

Figure 23: Copying an object
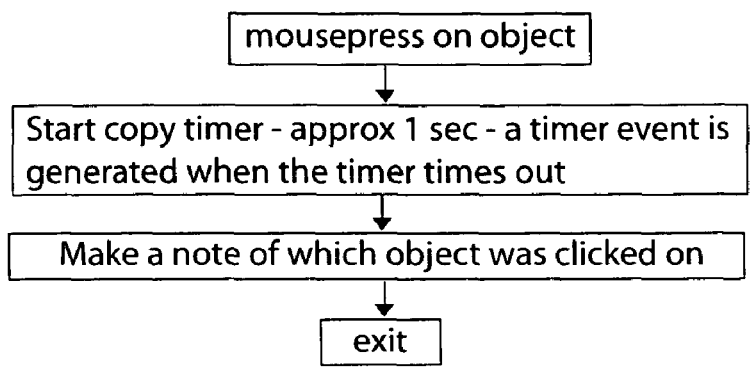
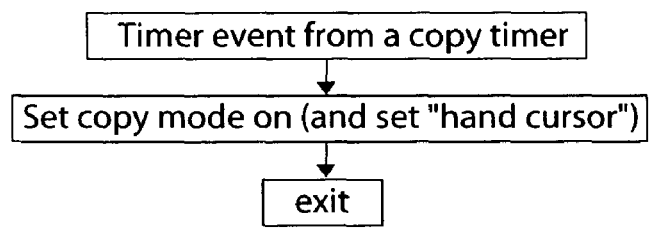
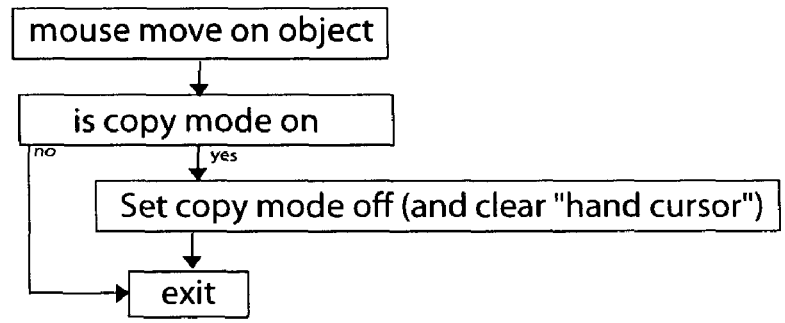

METRO FOR CREATING AND USING LINEAR TIME LINE AND PLAY RECTANGLE

CROSS-REFERENCE TO RELATED APPLICATIONS

This application is a continuation-in-part of U.S. patent application Ser. No. 09/880,397, filed Jun. 12, 2001 now U.S. Pat No. 6,883,145, which is a continuation-in-part of U.S. patent application Ser. No. 09/785,049, filed Feb. 15, 2001, for which priority is claimed. The entireties of the prior applications are incorporated herein by reference.

FEDERALLY SPONSORED RESEARCH

Not applicable.

SEQUENCE LISTING, ETC ON CD

Not applicable.

BACKGROUND OF THE INVENTION

1. Field of the Invention

The invention relates to graphical user methods for directing a digital machine having a display to play media files.

2. Description of Related Art

The linear time line has been a primary navigational and editing enabling technology in software products for over two decades for use in media development with a computer. The linear time line has under gone numerous changes and modifications by hundreds, if not thousands, of different programmers through these years. Yet for all of these modifications, all of the resulting linear time line operations have continued to remain dependent upon external access to tools. The access to these tools by the user has not changed much: these tools have generally been accessed by clicking on icons or by clicking on selections in menus.

One general characteristic of these tools that applies commonly to all permutations of linear time lines is that the utilization of these tools results in one action being carried out at a time. In other words, when any one of these tools, or a specific combination of them, is activated (selected) to enable a specific operation or function to be carried out on the linear time line, no other functions or actions can be utilized from any other of the tools or combinations of these tools.

In this type of environment users are constantly turning on and off various tools and combinations of tools to operate their linear time line to aid in the navigation through media and the recording, editing and playing of that media. The tools may include: (a) a play cursor which exists as an independent mode which must be entered in order to activate its use, (b) a zoom tool which requires the clicking on an icon or making a selection in a menu or order to activate it, (c) scrubber tools that enable a user to move forward or backward through the media, and (d) grab tools which enable a user to grab certain parts of media elements and move them, etc.

Each of the operations of these external tools are generally defined by a computer program that governs the use of the time line. Again, it should be noted that when each of these external tools is activated, this deactivates the other tools that are or could be used.

BRIEF SUMMARY OF THE INVENTION

The present invention generally comprises methods for onscreen graphical user interaction with a digital machine interface that enables a user to direct the machine to play media files of any type.

The invention provides two structures that provide an interactive collection of capabilities to provide a simple intuitive work environment and deliver direct access to the control of many media functions. This control is achieved without the use of media tools, as would commonly be accessed from icons, pull down menus and the like in other software. Rather, the control is achieved by the use of graphical means which are part of the Blackspace operating environment, as described in the copending applications captioned above and in companion copending applications Method for Formatting Text by Hand Drawn Inputs, Ser. No. 10/672,112, filed Sep. 26, 2003, and Method for Creating and Using Computer Passwords, Ser. No. 10/635,883, filed Aug. 5, 2003. These can be directly manipulated by a user to generate a spectrum of operability that replaces a wide variety of independent tools as required by existing linear timelines.

The two graphic structures are: (1) the Blackspace Timeline (BTL), and (2) the Play Rectangle (PR). Both of these structures exist as graphic objects and they permit users to both navigate and operate (e.g., edit, scrub, assemble, combine, etc.) media without the use of external tools, e.g., a zoom tool, a play cursor, which must be entered as a separate mode, etc. It should be noted that both the BTL and the PR can be used for multiple overall purposes. They have two different modes of operation. These are: (1) functioning as a time scale device and (2) functioning as a measurement device. The user operation and interaction with the graphic elements of both the BTL and the PR to accomplish both purposes are largely the same. This means that the BTL and the PR have the same user interface for their operation and that this interface can be used for two independent modes of operation.

It is the following combination of abilities that enables the BTL and PR to eliminate the need for commonly required external time line tools. The BTL and the PR offer the following abilities:

1. The ability to move the timeline to any location onscreen as a graphic object. The ability for this graphic object to automatically become the top layer when it is moved so it remains visible over the media it is controlling.
2. The ability to change the length of the BTL and the PR.
3. The ability to rescale the BTL and the PR.
4. The ability to reposition media on the BTL and the PR without changing the length or scaling of either timeline.
5. The ability to play media backwards and forwards at a user controlled pace by manipulating a single graphic object on the timeline. This object is called the play cursor.
6. The ability to create and attach play bars as required, derived from any piece of individual media in a media performance, to a BTL and/or PR.
7. The ability to automatically glue (attach) the individual play bars to the BTL and PR such that when the either timeline is moved, all of the play bars associated with it move along with it as a single composite graphic.
8. The ability for the BTL and the PR to be assigned to another graphic object or device and later be recalled from these objects and/or devices as a fully operational timeline.

9. The ability for a BTL and a PR be duplicated multiple times and have each duplicate's properties (1-8 above) independently set, but at the same time have all of these duplicates continue to reference the same piece(s) of media or media performance(s) that were referenced by the original timeline.
10. The ability to enable the BTL and the PR to be converted into a device, which no longer measures time, but instead measures distance. We call these devices "media rulers."

BRIEF DESCRIPTION OF THE DRAWING

FIG. 4 is an illustration of a Blackspace time line depicting dragging the play cursor to play media.

FIG. 5 depicts a time line and the provision of a parameter window for the play cursor.

FIG. 6 depicts a time line and the provision of a play cursor at a click point on the time line.

FIGS. 17-23 depict flow charts that describe the software routines used to achieve the functions of the invention.

DETAILED DESCRIPTION OF THE INVENTION

The present invention generally comprises an improved method and graphical object for directing a digital machine having a display to play media files. With regard to FIG. 1, one embodiment of the invention includes a Blackspace Timeline (BTL) 1. the BTL 1 has a lower portion 2, which consists of a horizontal line that runs along the length of the timeline. This is called a Gray Bar. To move the timeline the user left-clicks on the Gray Bar 2 and drags in any direction. The BTL is a graphic object and as a graphic object it can be placed anywhere onscreen that a user desires. This is not a feature found in other timelines provided by prior art computer programs, where timelines are generally fixed within the overall architectural layout of an operational page or virtual console that is supplied to a user for the purpose of editing and playing back and recording media. These time lines are not independent graphic objects.

Figure 1:
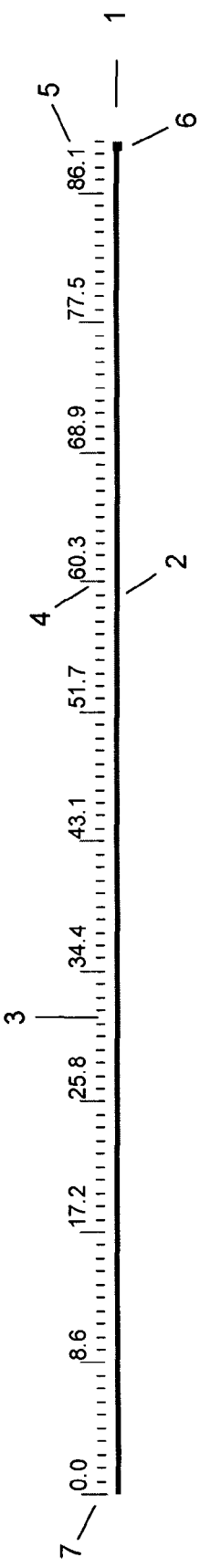
FIG. 1 is a depiction of a Blackspace time line in accordance with the present invention.

Also in FIG. 1, the BTL includes a row of gridlines 3 which extends for its full visible length as part of its structure. These gridlines 3 can take many forms. One such form is a series of closely spaced short vertical lines that are arrayed along, and perpendicular to, the top surface of the Gray Bar of the timeline. These gridlines may be a different color than the Gray Bar, e.g., yellow or brown or black (depending upon color of the background over which the timeline is situated). This difference of color enables a user to quickly identify the gridlines as a separate operable structure of the overall BTL.

Figure 2:
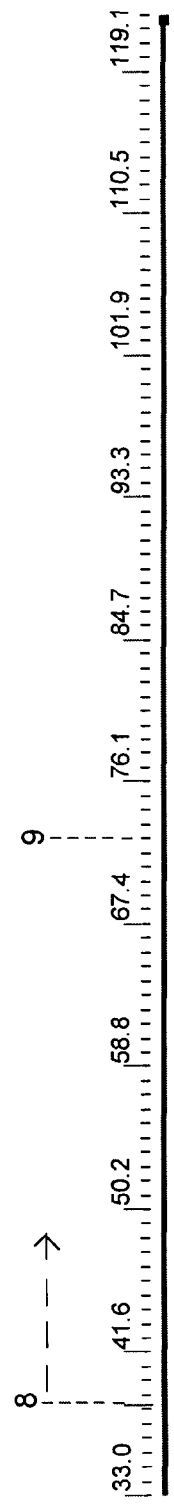
FIG. 2 is an illustration of a Blackspace time line as shown in FIG. 1, depicting a click/drag method for changing the time scale.

To operate these gridlines 3 a user left-clicks anywhere on the gridlines (also referred to as the timeline grid) and drags to the right or to the left. FIG. 2 shows the grid after it has been clicked on at point 8 and dragged to the right to point 9. As this dragging action is carried out alphanumeric labels along the timeline change to progressively higher numbers. This results in the visible time represented along the timeline being a different section of time than what is presented along the timeline of FIG. 1. In FIG. 1 a time extending from 0 seconds to approximately 86 seconds is represented. In FIG. 2 a time extending from 33 seconds to 119 seconds is presented.

Figure 3:
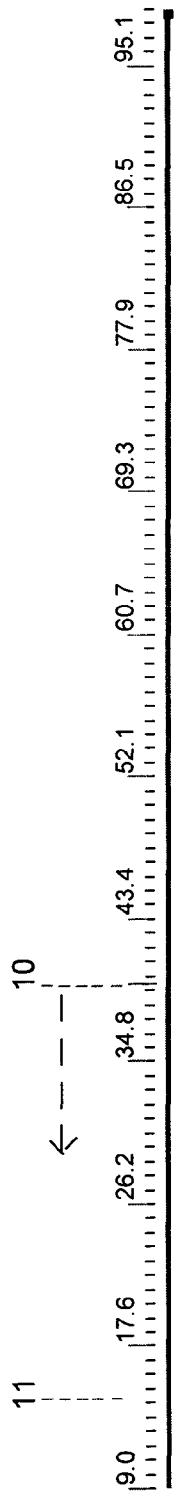
FIG. 3 is an illustration of a Blackspace time line as shown in FIG. 1, depicting the opposite click/drag method to FIG. 2.

With regard to FIG. 3, in the reverse drag process the point 10 is clicked on in the gridline area and dragged to the left until point 11 is reached. This changes the visible time presented along the timeline to a range of 9 seconds to approximately 95 seconds. Thus, by clicking on the gridlines and dragging to the left the user can bring into view media that is situated along the timeline before the time range currently presented. By clicking on the gridlines and dragging to the right, the user can bring into view media that is situated along the timeline after the time range currently presented. The gridlines thereby enable a user to see play bars and other representations of media in a Drawmation, Slide Show or the like along the timeline without having to rescale the timeline, by merely clicking and dragging to advance or regress the timeline range and display a new range that may have other media representations therealong.

Referring again to FIG. 1 scale gridlines 4 are longer gridlines extending perpendicular to the Gray Bar 2 of a timeline. The scale lines are formatted to define groups of 10 divisions of the timeline to provide a decimal division of the line. These scale lines can be left-clicked on and dragged to the right or left to rescale the timeline. This rescaling process is described below. The BTL provides an alphanumeric label 5 adjacent to each scale gridline. These labels increase in value from left to right, and express magnitudes of parameters that may represent a wide variety of user-definable values, e.g., minutes, seconds, milliseconds, frames, samples, or measurement values, like mm, cm, or fractions of inches, etc. These labels are themselves graphic objects and can be directly manipulated by a user to change the resolution of the BTL. These labels 5 can also be directly changed by the user to a different language or measurement system, a different color, font type, style or size, or be replaced with any hand drawn graphic, or a picture, video, animation, etc.

To change the resolution of the BTL or PR, a user left-clicks on any BTL text label and drags to the left to increase the total resolution of the BTL or drags to the right to decrease the total resolution of the BTL. The resolution of the BTL equals the total amount of time or measurement distance represented by the visible length of the BTL. As the user drags any text label along the BTL all of the other text labels respond by first changing their relative positions along the timeline. Then as the user continues to drag in the same direction, these labels change their values to different values to reflect a larger change in the resolution of the overall timeline.

Referring again to FIG. 1, the timeline includes a resize button 6 located at its right end. Using this button 6 the timeline can be shortened or lengthened (in terms of distance end to end of the displayed line) at will. This is accomplished by clicking on the end of the timeline gray bar and dragging to the left to shorten its length or dragging to the right to extend its length. A resize button can exist at the right end of the PR. Floating the mouse cursor over this button can cause it to turn into a double arrow and then dragging will change the length of the PR. This is pretty standard in the art.

Referring once again to FIG. 1, the BTL has another graphical element, called the Play Cursor 7. This play cursor can be operated at any time without entering an independent mode or changing mode. This play cursor can be represented by many different types of graphical objects. One such object is short green line 7, extending perpendicular to the surface of the BTL Gray Bar. The BTL play cursor can be used for the following functions:

Referring to FIG. 4, dragging the play cursor 7 will cause the media to play. Dragging the play cursor to the right will cause the media to play forward and dragging the cursor to the left will cause the media to play backwards. The dragging of the play cursor enables a user to quickly navigate through the media being controlled by the BTL. As a user drags the play cursor, the media plays back at a speed that the user controls to quickly move through the media to find a location in the media playback, e.g., to make a change, or add to the media or delete something from it. If a user drags faster towards 12 or 13 in FIG. 4, the media plays back faster.

Referring to FIG. 5 when the mouse cursor 16 is floated over the play cursor 7, a parameter window 15 appears for the play cursor. As the play cursor 7 is dragged from right to left, the numbers in this parameter window change to show the position of the play cursor along the timeline.

With reference to FIG. 6, left-clicking on the BTL Graybar 2 at point 14 causes the play cursor start from that point. When the mouse is clicked on this point, the play cursor jumps to this click-point on the timeline. This enables a user to set the start point of playback for media play along the timeline by left-clicking to place a play cursor along the BTL and turning on a play switch or its equivalent to play back the media.

When a piece of media is created in Drawmation (see co-pending application Drawmation), it can be of any temporal length. When a BTL is created and displayed for this Drawmation, it will at first be displayed at a default length, determined by a user-selection in an options menu. However, when the Drawmation is played back for the first time, the BTL overall length and timeline parameters will be automatically adjusted to show the exact time that elapsed during the recording of the Drawmation. The benefit of this is that the user is not forced to navigate through an arbitrary length of timeline that would normally be much longer than the length of the Drawmation that was just created. It should be noted that the BTL's overall time will expand as the length of media recorded in Drawmation is re-recorded or added to increase its overall length of time.

All the timelines are known to the Drawmation manager. This is the object which interfaces between the GUI and the Drawmation. Every time a time line is created the GUI tells the Drawmation manager to add it to its list. When Drawmation itself is playing it is continuously sending messages stating the current time of the Drawmation playback. The Drawmation manager receives this message and controls each related timeline to set its play cursor accordingly. The procedure thereafter is depicted in the flow chart entitled Setting the time, FIG. 22. Note that once a piece of media (e.g., a Drawmation) is recorded, multiple BTLs can be created for it.

Figure 7:
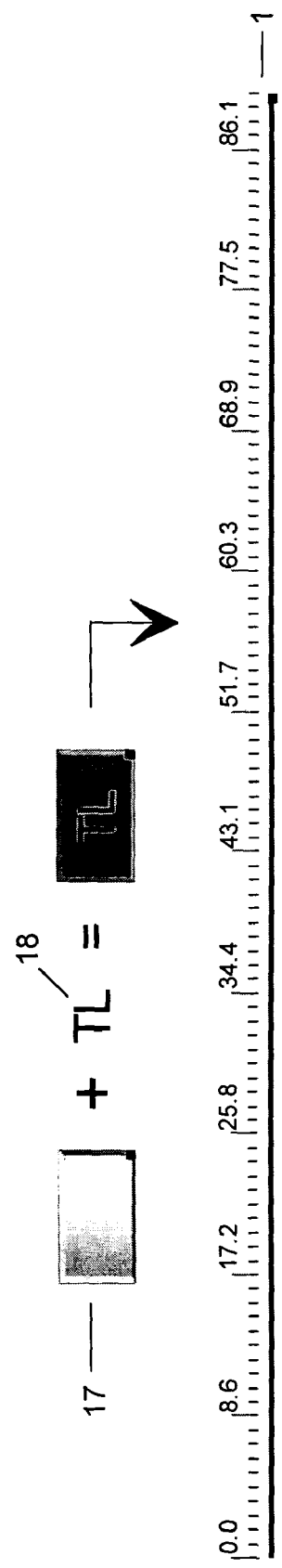
FIG. 7 depicts one technique for creating a Blackspace time line.

There are several methods available for creating a BTL. FIG. 7 depicts a typical Blackspace technique: creating a switch 17 onscreen and typing TL 18 on it, which the software recognizes as "timeline" and responds by making the switch 17 a timeline switch. Thereafter left-clicking on switch 17 activates it and the BTL 1 will appear onscreen. Another method is to use a verbal command, e.g., say "Timeline" or "BTL" and the BTL immediately appears onscreen. Still another way is to type: "BTL" or "TL" onscreen and hit the Esc or Enter key and the BTL appears.

The software of this invention supports having multiple BTLs operating at the same time for the same piece of media. Each of these timelines can be set to a completely different resolution. This provides a user with a powerful set of tools for navigating through their media at both high speed and high resolution.

Figure 8:
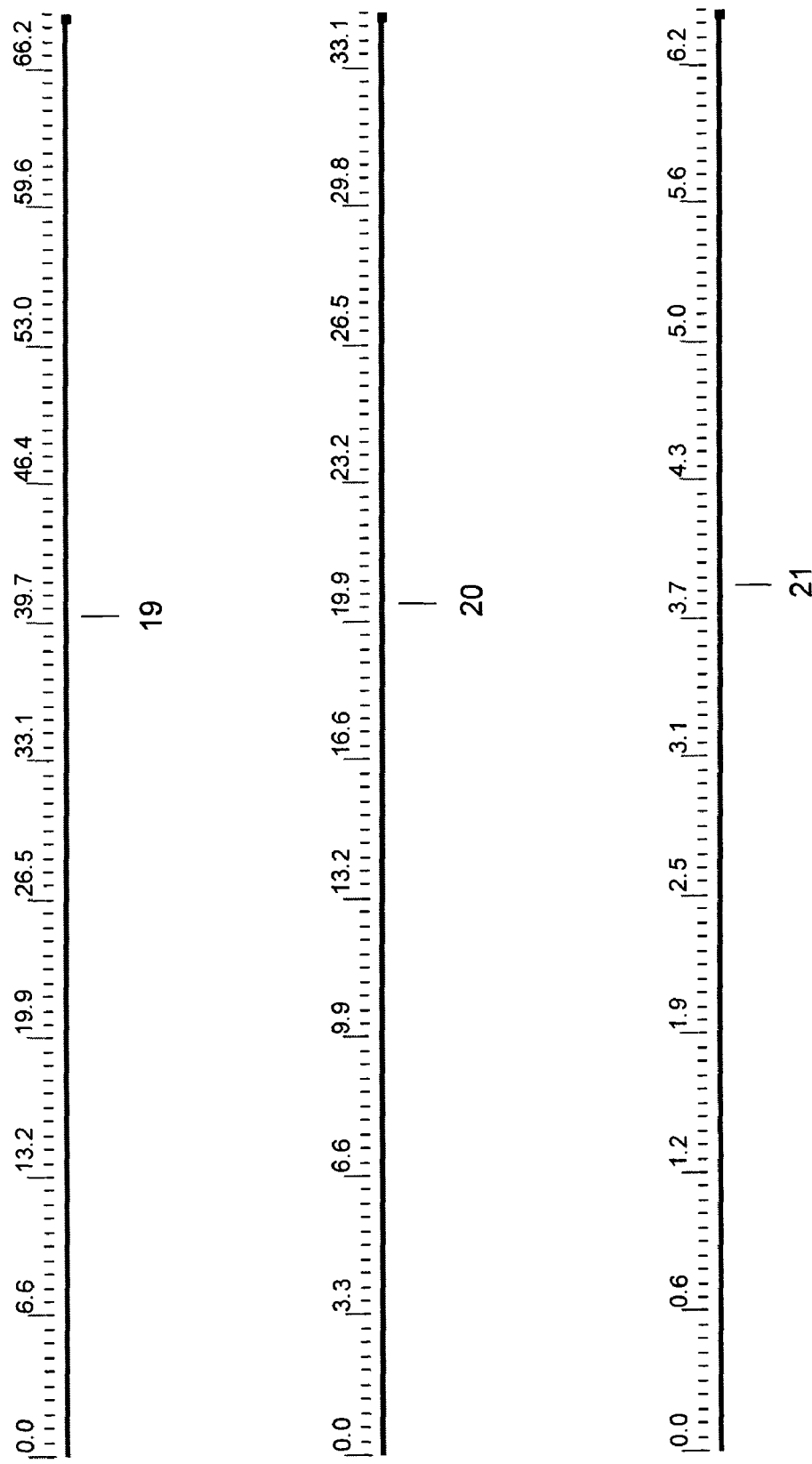
FIG. 8 depicts multiple time lines for a single piece of media.

FIG. 8 shows multiple BTLs for a single piece of media. This could be any piece of audio, video, animation, Drawmation, etc. BTL 19 shows the full time of the media along its length, while BTL 20 shows half the time of the media along its length, and BTL 21 shows approximately 10% of the time of the media along its length. Each of these BTLs can be used to navigate through the media and navigating on one of these BTLs (e.g., dragging the play cursor for that BTL) will update the position of the play cursor in all of the other visible BTLs.

When playing a Drawmation file, the system is sending out messages every 30 ms giving the playback time, so that any new time line that is created is automatically referenced to this time.

Figure 9:
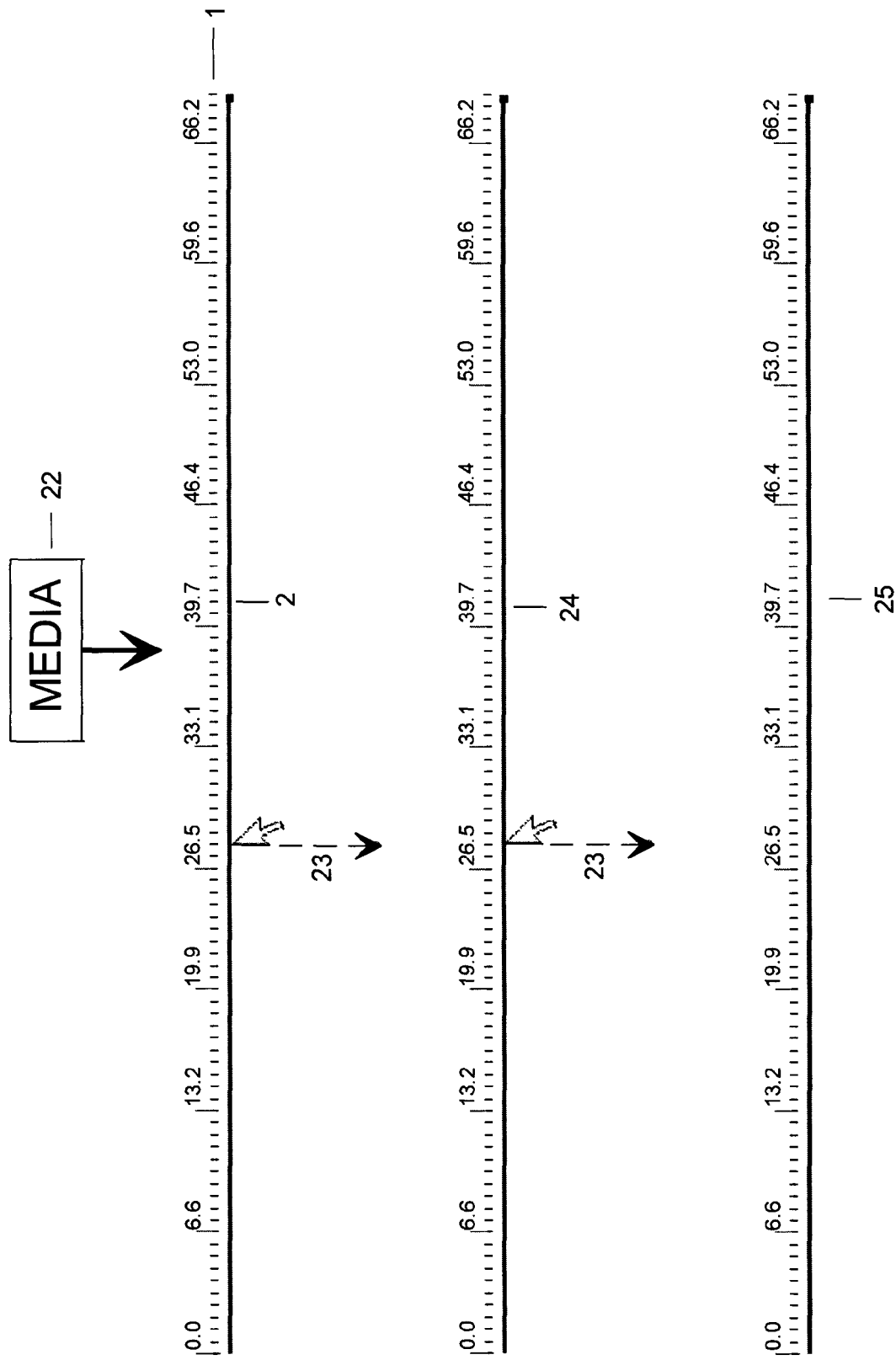
FIG. 9 depicts copying a time line.

Referring to FIG. 9, a BTL can be duplicated any number of times from one original BTL. All of these duplicated BTLs will reference the same piece of media 22. Each of these duplicated BTLs (24, 25) can have their resolution or range changed to cause each of them to represent a different length of time for the same media. To duplicate BTL 1 the user may left-click and hold on the Gray Bar 2 of the BTL 1 and wait for a specified time period, which is user-defined. The default is one second. Then after holding down for one second, drag away a copy of the BTL, as shown along dashed line 23 of FIG. 9, to create a duplicate BTL 24. Both BTLs will control the play back of the same media 22. To make another duplicate, click and hold on the duplicate 24 or the original 1 and drag away another copy. Each copy will be a fully functional BTL that can be used to control the same piece of media 22. Another method of creating multiple BTLs is to create a second TL switch and turn it on. This will produce a second TL. This TL will automatically become the timeline for the current Drawmation session.

All of these BTLs reference the same piece of media, but they can have completely different scales and ranges. One BTL could show a scaling that equals the entire length of the media along its visible length. Another could show a fraction of time of that media along its visible length. If a user then turns on the play switch to play a piece of media, the play cursor of each duplicated BTL will move at a rate which is determined by its scaling.

Using multiple BTLs for the piece of media has many practical values. One example is that it enables users to quickly find different areas in a single piece of media by being able to view multiple time resolutions of the same media as displayed on multiple BTLs that reference that same piece of media. This also provides multiple zooms for viewing and controlling the same piece of media.

Since the BTL is an object it can be assigned to various geometric objects, e.g., stars, triangles, circles, squares, etc., and these BTLs can also be assigned to various devices, like switches and folders. One advantage of assigning BTLs to objects and devices is to free up space in one's work environment. BTLs take up workspace and they are not always needed for modifying or playing a piece of media. Having multiple BTLs onscreen can take up a lot of workspace. While the sometimes the benefit of these multiple BTLs outweighs their cost in lost workspace, this is not desirable as a default work condition. Thus the ability to quickly remove these BTLs from being visible onscreen is very desirable. Assigning them all to a single object is one way to accomplish this purpose. Once the assignment is made, these BTLs are one touch away. Any time they are needed, the touches the object to which they were assigned and they immediately appear onscreen.

Methods and concepts for assignments are disclosed in the U.S. patent application Ser. No. 09/880,397, filed Jun. 12, 2001. Briefly, to assign one or more BTLs to an object, a user would first select a color that represents the arrow logic ("assign to"), then an arrow would be drawn that intersects or encircles (or a combination of both) all of the BTLs that are desired to be assigned to an object. Then the arrow is pointed to the object to which these BTLs are to be assigned. Upon the mouse up-click, the arrowhead of this drawn arrow will turn white or some equivalent graphical change to indicate that it has been operated. Then the white arrowhead is left-click on and the BTLs disappear into the object. To see the BTLs again, the user would left-click on the object to which the BTLs were assigned. To make them disappear again, this same object would be left-clicked on again, and so on. By this method, a user can better control the use of space in the creation of media in their computer, because timelines can be made to appear and disappear according the user's needs.

When one or more BTLs are assigned to a recognized object (see patent application—Graphic Objects), the use of space can be improved even further. This is because this graphic object to which the BTLs where assigned does not need to remain onscreen all the time. It can be deleted and redrawn and recognized whenever these BTLs are needed. If the object to which a number of BTLs were assigned is a gray star, the gray star can be deleted from being visible onscreen. Later when the BTLs are needed, the gray star can be drawn onscreen. After drawing the gray star and upon the next mouse up-click, the gray star will recognized by the software and change from being a wire frame to being a filled object—a solid gray star. Then if this star is left-clicked, the BTLs will immediately appear onscreen. They will be fully operational and can be modified in any way desired by the user.

Figure 10:
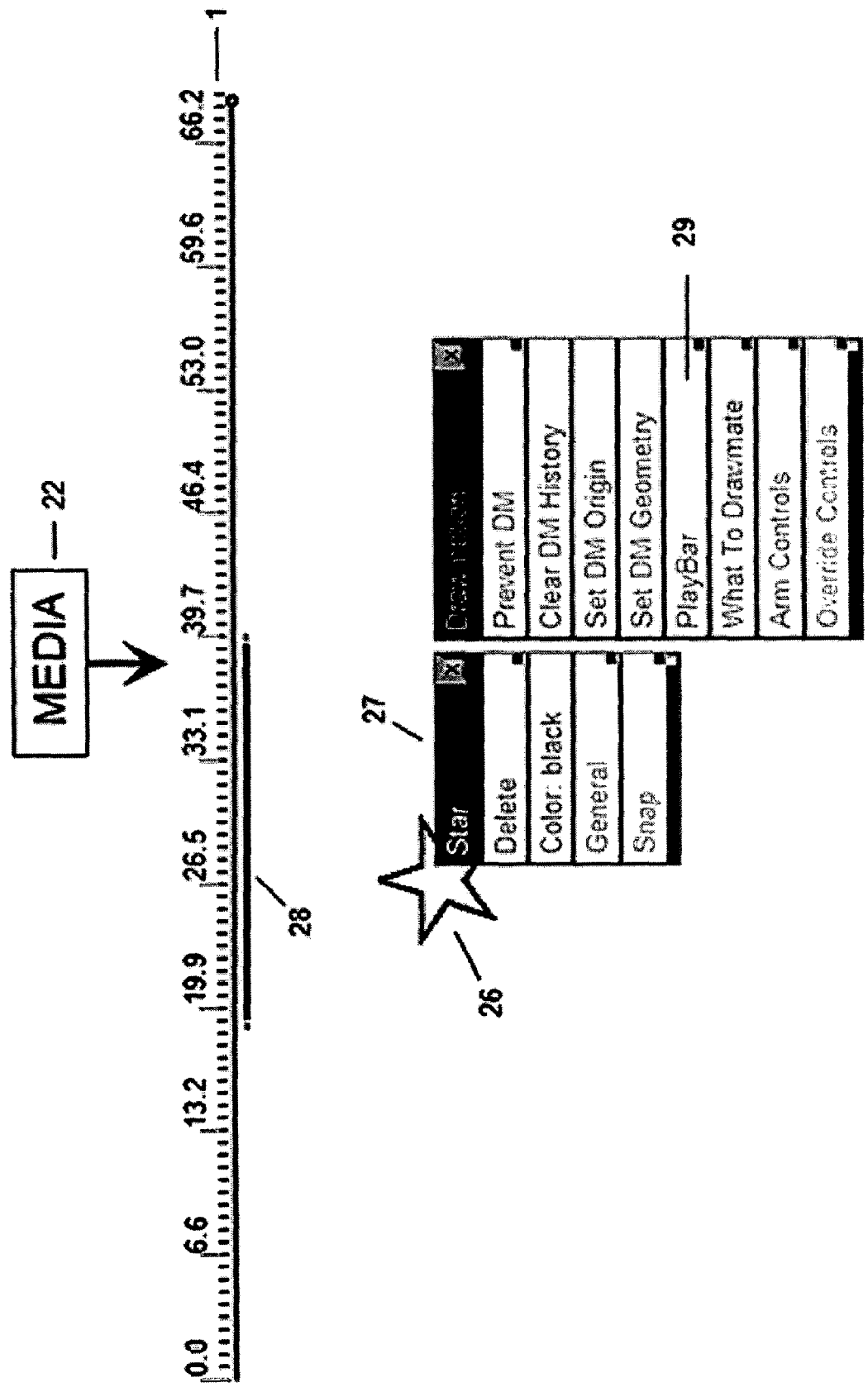
FIG. 10 depicts one method for placing playbars on a time line.

The invention provides two methods for placing playbars along a BTL. Referring to FIG. 10, an item that has been recorded as part of a media performance may be stored in star 26, using, e.g., the arrow technique described above. The user may right click on star 26 to display Info Canvas 27, and the entry "Play Bar" 29 can be selected and the play bar for this item will appear under the BTL 1 that is associated with the media 27. Since almost all items in media performances created by this invention are independent graphic objects, each of these objects can be dragged to the BTL to generate a play bar for each object. Thus multiple playbars 28 may be provided on a timeline, and they may overlap to cause simultaneous and coordinated playback of multiple media files.

Figure 11:
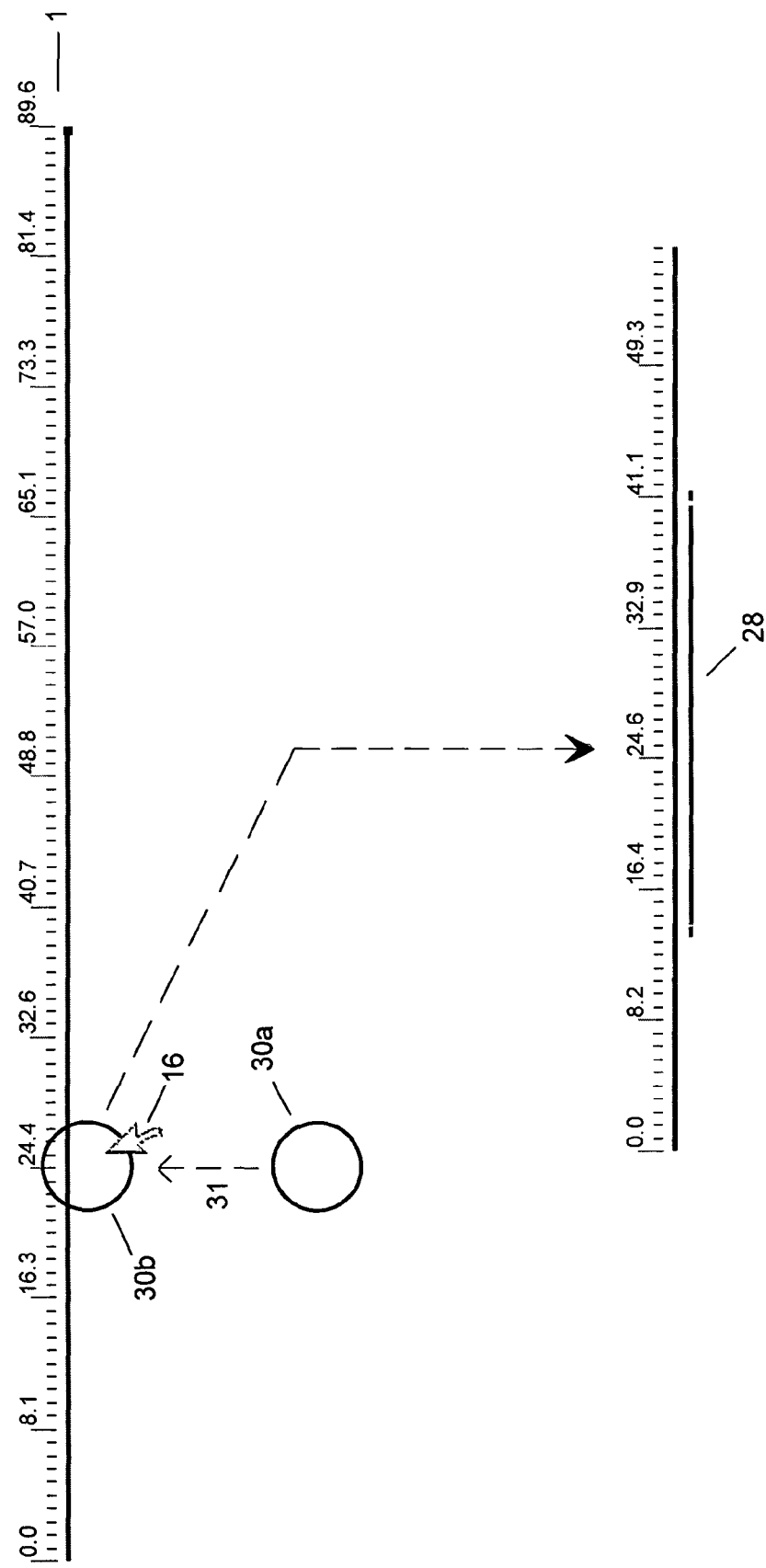
FIG. 11 depicts one method for creating multiple playbars on a time line.

There are two methods for creating multiple playbars. FIG. 11 shows a circle object 30a being dragged by a mouse cursor 16 along path 31 so that a portion of the circle intersects a portion of the BTL 1. With this method, any object representing a media file can be dragged to intersect any portion of a BTL to cause a play bar for that object to appear adjacent to that BTL. When the intersection occurs, as shown by circle 30b, a mouse up-click is performed while the object 30b still intersects the BTL 1 and this action causes a play bar 28 for that object to be created and appear under the BTL.

Figure 12:
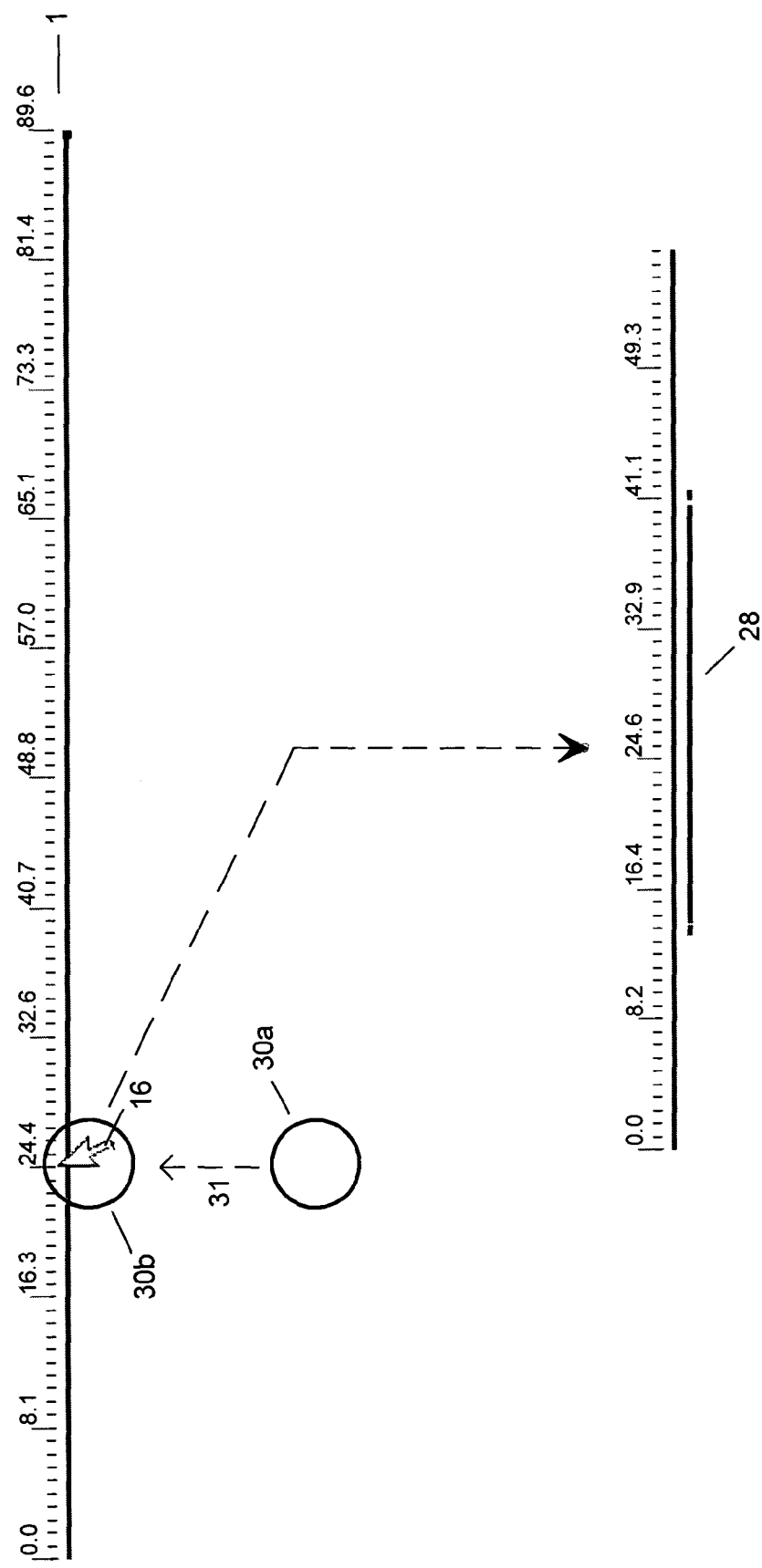
FIG. 12 depicts another method for creating multiple playbars on a time line.

Alternatively, as shown in FIG. 12, the object can be dragged so a play bar for that object will not appear under the BTL, unless the tip of the mouse cursor is over some portion of the BTL when the mouse up-click is performed. FIG. 12 depicts this process. It is the same as that described under FIG. 11 except that the tip of the mouse cursor must overlap the timeline for a play bar to be created for the object being dragged to the playbar.

Figure 13:
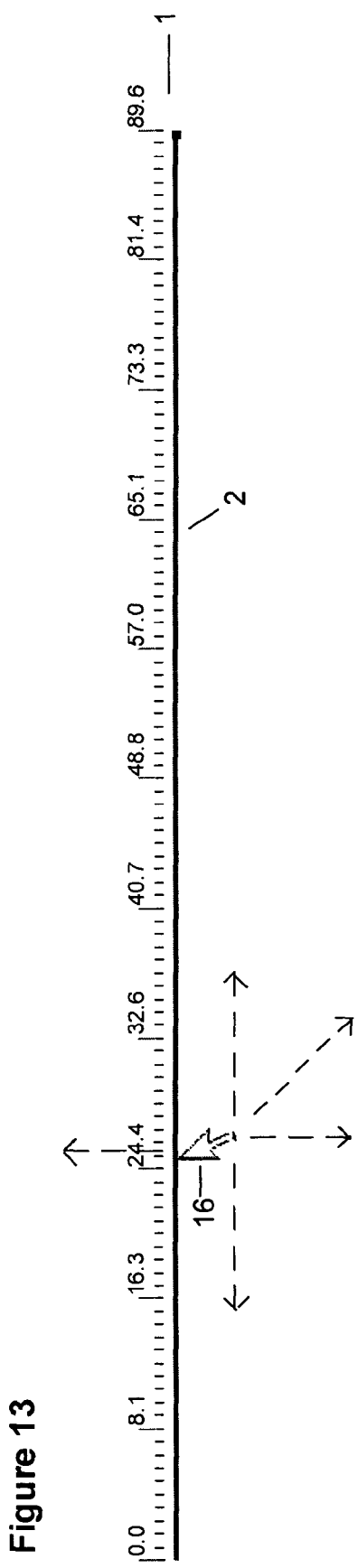
FIG. 13 depicts the layer trait of a time line.

Referring to FIG. 13, the timeline is a graphic object that can be moved and automatically rise to the top layer. This means that dragging the timeline over any piece of media will guarantee that the timeline, acting as either a ruler or timeline will remain visible at all times. However, if the media is dragged to the timeline, the media will then become the top layer and overlays the timeline. In this manner both media and timeline can be operated in any layer position relative to each other. The BTL 1 in FIG. 13 is being dragged by left-clicking the tip of the mouse cursor 16 on the Gray Bar 2 and dragging an any direction.

Figure 14:
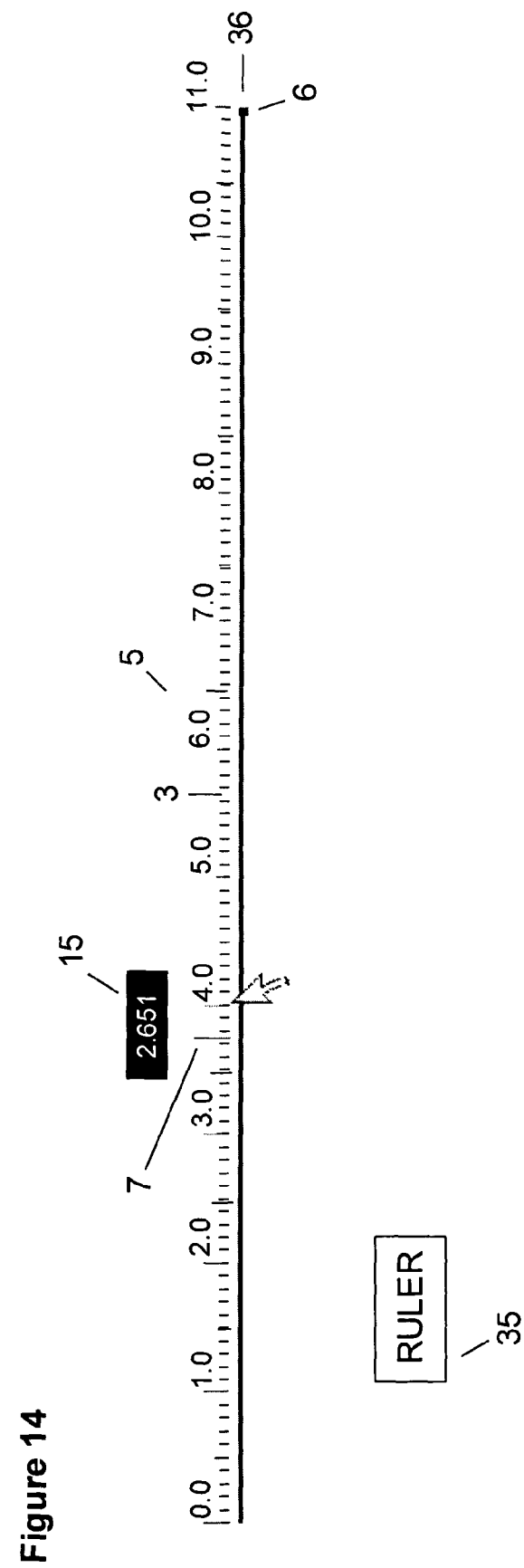
FIG. 14 depicts a time line converted to a linear distance measuring tool.

With reference to FIG. 14, a selection can be made in a menu that turns a timeline into a measuring device 36 rather than a time device. In other words, rather than showing the passage of time for a piece of media, the timeline can be converted to show measurements of distance. Alphanumeric labels 5 become distance parameters. Since the timeline 36 exists as a separate graphic object and therefore can be moved anywhere onscreen, it can be dragged over any object or objects and used to measure their size or the distance(s) between objects, etc.

To change a timeline into a ruler a user could do any of the following: Type the word "ruler" onscreen and hit a key, e.g., the Esc key or Enter key to activate this function. Upon activation, the software recognized this text as a command, and a timeline "ruler" will appear that can be dragged anywhere on screen to measure anything. In addition, resizing the timeline ruler will automatically change its measuring length and dragging on any ruler measurement and dragging to the left will increase the incremental measurement capability of the ruler. Alternatively, the user may type the word "ruler" on a switch 35 (see FIG. 7 for making a switch) and turn on the switch. Or, the user may speak the word "ruler" into a speech recognition system to enter the same command.

The ruler may be employed with the following methods.
Method 1: Drag the ruler to any location onscreen and position it such that a user can reference the position of any object against the distance measurement indications along the ruler.
Method 2. In addition to Method 1, drag the green "play cursor" which is now a measuring cursor, to any location and as this measuring cursor is dragged a parameter number will be constantly updated to show each new position of the cursor as it moves back and forth along the "ruler". These parameters will show the distance that the cursor has traveled from the beginning of the ruler, thereby enabling a user to place the beginning of the cursor at a certain point on the screen and measure the distance that any point is from the beginning of the ruler.

Method 3: In addition to Method 2, moving the measurement cursor and then double clicking on it will place a marker that can be a numerical parameter that equals the distance that the cursor is from the beginning of the ruler.

Method 4: In addition to Method 3, if one resizes the ruler to extend its length, this will be akin to extending a tape measure. In other words, the ruler will not only increase its length, but each measurement marking along its length will be added to with incrementally larger numbers as in a tape measure.

Method 5: In addition to Method 4, clicking and dragging on the ruler's grid lines will reposition the measurement section of the ruler. For example, if the ruler is 4 inches long and that it is marked in $1/8^{th}$ inch increments, the extreme left end of the rule is 0 inches and at the extreme right end of the ruler is 4 inches. The entire distance between these two points is divided by $1/8^{th}$ inch markings. Therefore there would be 32 separate markings along this ruler.

If a user clicks and drags to the left on the ruler grid lines, the measurement markings will change to a new set of markings. As the user drags to the left, 0 will no longer be seen. It will have become 0.5 inch or 0.7 inch or 1 inch. Also 4 inches will no longer be at the right end of the ruler.

By this method, the user can reposition the measurement markings along the ruler to start and end with any group of consecutive markings that are in keeping with original layout of the ruler as defined by a user. In this case it is $1/8^{th}$ inch markings.

Like the linear time line, the "ruler" can be rescaled. However, rescaling the ruler does not change its measurements, it changes the zoom for the environment that the ruler controls. To do this, the user clicks and drag on any number parameter or scale gridline and drags to the left or right. Dragging to the left will zoom out and dragging to the right will zoom in.

If the ruler is placed in Primary Blackspace, rescaling the ruler will change the zoom for the entire screen area. If, however, the ruler is clipped into a VDACC, then changing the resolution of the ruler will change the zoom for just the area of that VDACC.

To change the rulers parameter markings, a user may make a selection in a menu, an Info Canvas or the like. In addition, the user may use a verbal command, e.g., $1/8^{th}$ resolution or centimeter or millimeter resolution. In any case, the ruler would respond by dividing its length equally by the specified length parameter and showing the divisions as visible markings along the length of the ruler. Note that the PR (see below) could be used to measure the perimeter distance of any object with straight sides.

Figure 15:
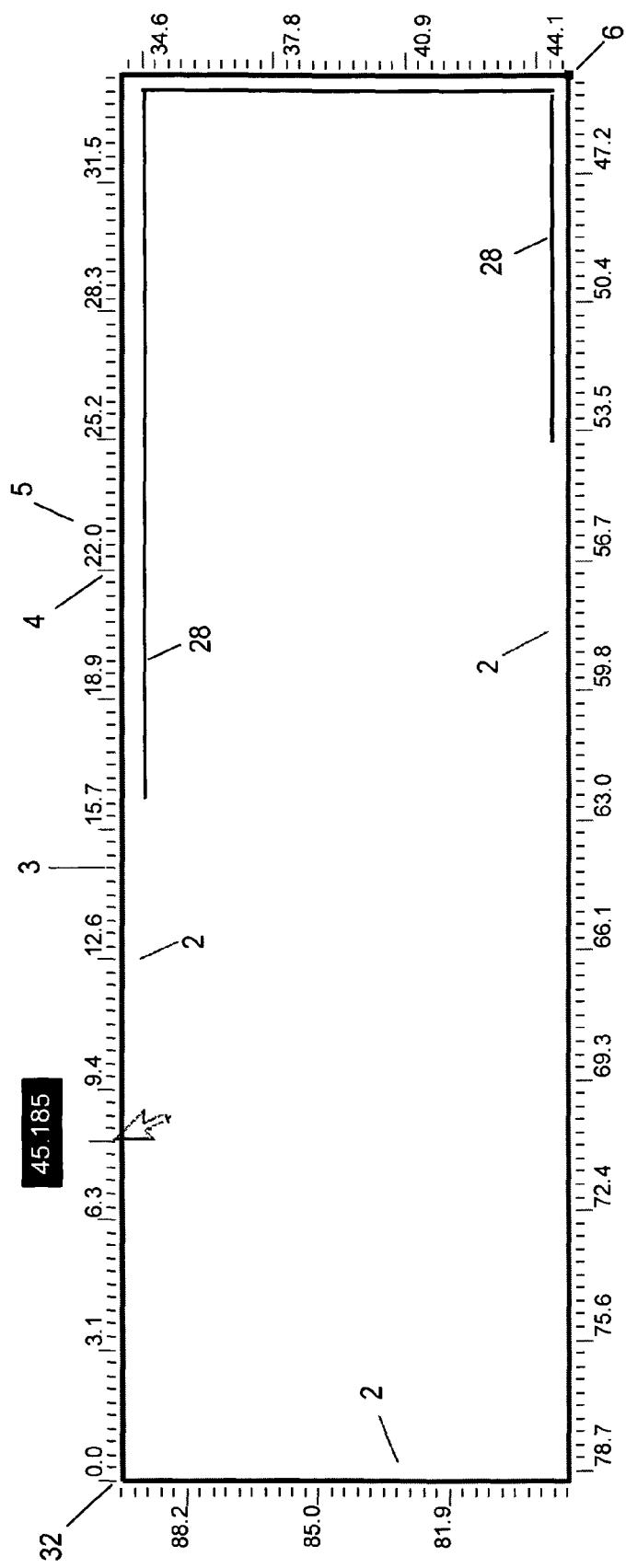
FIG. 15 depicts a Play Rectangle in accordance with the present invention.

The invention also provides a play rectangle (PR) structure for controlling the play of media files. With regard to FIG. 15, the PR is a device similar to the linear timeline. The PR has four separate sides that are connected in one contiguous length, so that progress about the perimeter of the PR can be used to represent time for a piece of media. All of the traits described above for a BTL are the same for a PR, but the PR has the potential for supplying the user with a much greater length of usable timeline linear area to work in. The PR also has play bars 28 that go around corners. All of the play bars for a PR when dragged are capable of extending into, through and around the four corners of the PR. The PR shares all of the benefits and features discussed above for the linear time line, plus is offers additional features and benefits not mentioned in the paragraph above. They are discussed below.

Figure 16:
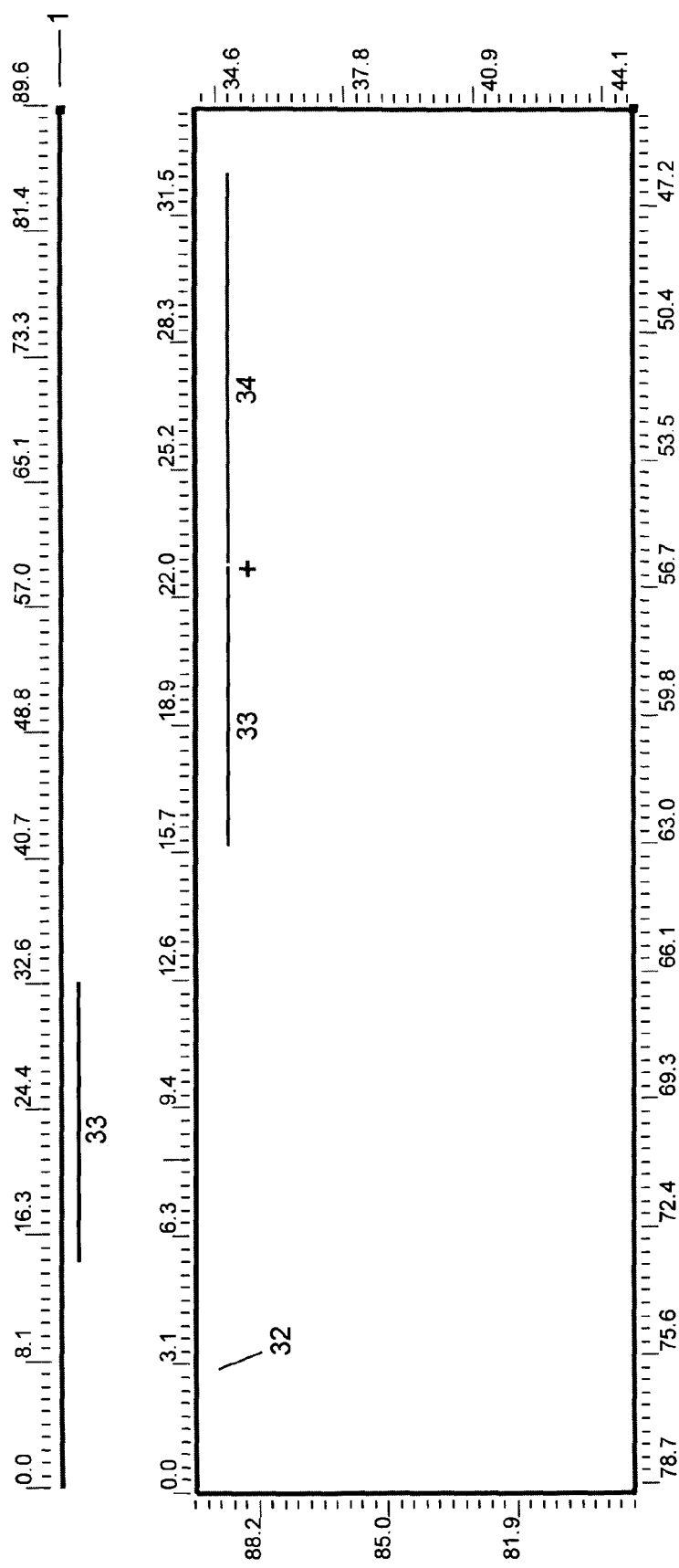
FIG. 16 depicts a comparison between a time line and a play rectangle of the invention.

FIG. 16 shows a comparison between a BTL1 and a PR 32. For a given length of a linear timeline, the PR offers many times the linear distance, to represent the same amount of time at the same resolution. Distance 33 along the BTL 1 is graphed along the PR 32. The distance 34 is the additional distance afforded by the PR for the same period of time along the PR. If the PR were made taller, this distance would increase even more. The longest linear time line is one that extends across the width of the screen. The longest Play Rectangle (PR) extends around the entire perimeter of the screen. This means that there are a multiple of times more linear space to place markers, draw notes, etc., on a PR compared to a linear timeline. In addition, this added graphical length enables a user to have a greater control over dragging the play cursor. Since the play cursor is a graphical object, the more pixels that are represented along its length of travel for a given representation of time, the more smoothly it can be operated as a control. For instance, the PR could fill the entire screen. It could go around the entire perimeter of your monitor providing a very significant increase in timeline workspace. Also the PR by fitting around the perimeter of the screen, is out of the way of the general work area. If 1 mm on a linear time line equals 1 seconds of time, then this same length of time could be represented by 4 mm of length on a PR.

The PR can be made any size and used as a navigational device for any point in a media regardless of the length of time that this media represents. The physical size of the PR could be the size of a postage stamp, yet a user could easily use it to navigate anywhere in a piece of media that was an hour long. When a play bar is dragged along a linear time line, it moves from right to left and remains a straight line at all times. When the same play bar is moved around a PR, it changes its shape to include one or more right angles as it moves through the corners of the PR. In a slide show as supported by this invention, the PR has multiple functions that extend beyond serving as a navigational device or a playback control. The PR can be used to control the size and proportion and location of all the media playing back in a slide show. A user can select in a menu the ability to play slide show media in a PR. Like the linear timeline, the PR can be resized; however, resizing the PR affects the volume of space inside the perimeter of the PR. If a user can make a selection that places all media inside a PR and therefore controls the size and proportion of that media by the size and shape of the PR. The user can create any number of linear or rectangular timelines. This is done by creating a switch and labeling it "TL" or "PR". This causes the Drawmation manager to add the switch to the list of those it is interested in. After the switch is pressed, this event is intercepted by Drawmation Manager, which requests the GUI to create a Linear(TL) or a rectangular timeline (PR). When a timeline is created the Drawmation Manager adds it to its internal lists and logs the association between the timeline and the switch. Each subsequent time the switch is pressed, DM causes the associated timeline to be shown or hidden.

Note that visual media may be display any place onscreen, in any size format, and the timeline may be dragged and positioned in any relationship to the visual media playback. When the PR is used, the visual media may be directed to appear within the play rectangle, which may act as a frame or border. Alternatively, the visual media replay may be positioned outside the play rectangle, as desired by the user.

The flow charts that depict the software routines behind the functions described above are shown in FIGS. 17 to 23. In FIG. 17, Getting a Playbar, begins with The state Timeline object—control collides signal received. The mouse and general collision system has detected that the timeline and a control have collided. This flow chart is a routine in the timeline code to deal with this collision. An example of something that would cause this collision would be dragging a star object that has been recorded in Drawmation such that the object or the tip of the mouse cursor intersects any part of a linear timeline or Play Rectangle (PR). If Drawmation record mode is active, the process is done. If not, then is colliding object locked to a VDACC? This feature is here mainly for use with creating slide shows in Drawmation. For example, if a user drags a photo that is locked to a VDACC, then they will drag the VDACC along with the photo. Although the object that the mouse has clicked on is a photo, what is colliding with the timeline is a VDACC. If the object is locked to a VDACC, the system can still recognize a collision, but the play bar that results from the collision is for the VDACC and not for the photo. If yes, use the VDACC instead of the object. In the next step, is "mouse release in grid" ON? This is an entry in the DM Play switches Info Canvas. In this Info Canvas it is stated differently so as to be easier to use. It is stated as: "Mouse must release on timeline." If yes, is mouse upclick point within the geometry of my elements? In other words, is the tip of the mouse cursor directly over some point in the timeline? If no, then is "must come from below/outside" set ON? This is another entry in the DM Play switches Info Canvas. This exists for the purpose of enabling objects to be dragged from above a time line without getting a play bar for those objects when they and/or the mouse tip intersect the timeline.

If above test passed, then does playbar exist for this object? If yes, then refresh DM information for this playbar. This command makes the play bar for the object visible again. Referring again to does playbar exist for this object? If no, then find empty space for a new playbar. Play bar placement works where first placed play bar appears directly under the timeline Gray Bar. Then the next placed play bar appears directly under that play bar and so on. If one of these play bars is hidden or deleted, this leaves a gap between the bottom of the timeline and the next play bar below it. In this case, the created play bar will appear in this gap. If yes, then create new play bar and place on timeline. Then, refresh DM information for this playbar. Then, move colliding object by the mouse drag distance stored in the object and the process is done. This step takes the distance that the object that was dragged to intersect the timeline (this distance is stored in the object) and reverses this movement to enable the object to snap back to its original position before it was dragged. This snapping back action in addition to the appearance of a play bar below the timeline tells a user that the operation of getting a timeline has been successful.

In the Method 2 entry for Getting a Play bar, the software looks to see if a playbar exists for this object. If yes, then refresh DM information for this playbar. If no, then follow above procedure to create a playbar for this object. Then, move colliding object by the mouse drag distance stored in the object, and the process is done.

FIG. 18 presents a flow chart for Getting Drawmation Information for a Play Bar. The play bar is a graphical representation of the Drawmation data held for a single object in the NBOR system. The play bar keeps a reference to the object it is displaying data for—the owner object. A play bar consists of an arbitrary number of segments. Each segment represents the time that the owner object is in some particular condition. There is a specific set of these conditions which are managed by Drawmation. Examples of these conditions are "hidden", "moving", "static", etc The play bar segment has a bar and two end points. The end points of each segment can be adjusted by the user to edit Drawmation information.

To refresh the segments on a playbar, the software enters the "Delete all the segments on the play bar" routine of FIG. 18. Then, it sends a message to Drawmation requesting the times for the object which is referenced by this play bar. This message contains the ID of the owner object and the timeline control which the play bar belongs to. This enables responses to be returned to the correct place. Then, the software returns to the idle state waiting for replies from drawmation. These replies will be a set of messages each containing data about a particular event in the DM session.

Whenever a play bar is created, a message is sent to Drawmation software asking for information that will enable the construction of the segments of the play bar. And when this information comes back the play bar gets drawn according to that information that came from Drawmation.

In the routine "Receive Drawmation message" the system first determines if the message contain time information. If no, the process is done. If yes, extract owner control ID, start time, end time, DM condition. Then, find the play bar which deals with this owner control. Then, the play bar creates a new segment based on the information in the message. The data extracted from the message is stored in the segment so that information about the segment can be given to the user without having to request more data from Drawmation. If yes, calculate the screen dimensions of the segment. This is based on comparing the segment start and end times with the start and end times of the timeline object and the screen resolution currently set for the timeline. Segments which are not visible as a result of the above calculations, for example they fall past the end of the displayed region of the timeline, are still created but not shown.

All of the elements of the timeline graphic object are held in lists in the timeline object. These lists are: the short yellow lines—"gridlines", the longer light gray lines "scale gridlines", the text labels attached to each scale gridline, the play cursor, and markers placed on the timeline by the user. When the mouse is clicked down on an element of a timeline one of several mouse modes is entered, depending on what has been clicked on. The flow chart of FIG. 19 is titled "Configuring the timeline display using the mouse." This flow chart starts with a mouse click on a timeline. This flow chart describes possible responses to a mouse click on a timeline. Clicked on gridline?—yes, then —enter start time edit mode and the process is done. When the mouse is moved, first determines what mode it is in. Clicking on the gridline of a timeline starts the time edit mode. This mode means that the mouse affects the start time of the timeline. If no, then has the mouse clicked on scale gridline? If yes, then enter resolution edit mode and the process is done. The scale grid lines are the longer light gray lines in the timeline grid. These lines can be any color., settable by the user using the Free Draw inkwell or its equivalent. Color is quite necessary for the timeline. The reason is that the grid lines, the gray bar (which is gray on a black background) and the play cursor which is green may not be easily seen and distinguished and operated if they were all the same color. The grid lines and the play cursor as one pixel wide, which are not easily distinguishable from each other without color. Even the parameters next to the scale gridlines need color in order to be easily distinguished from the busy details of the timeline graphic.

If no, then has the mouse clicked on scale grid label? If yes, then enter resolution edit mode and the process is done. Rescaling a timeline can be accomplished by dragging a scale grid label (the parameter numbers just to the right of the scale gridlines or by dragging any scale gridline itself. If no, then has the mouse clicked on play cursor? If yes, then—enter time dragging mode and the process is done. If no, then has the mouse clicked on "gray bar" ? If yes, then enter time setting mode and the process is done.

Note that the operation of the timelines are dependent at least in part upon the system being able to deliver pixel accuracy for mouse clicks. If lines on a timeline which can be operated by a user are one pixel wide, that means that they represent a one pixel wide target. The touch accuracy of this software is pixel accurate to ensure that a user can reliably click again and again on one pixel wide targets and not miss.

Figure 20:
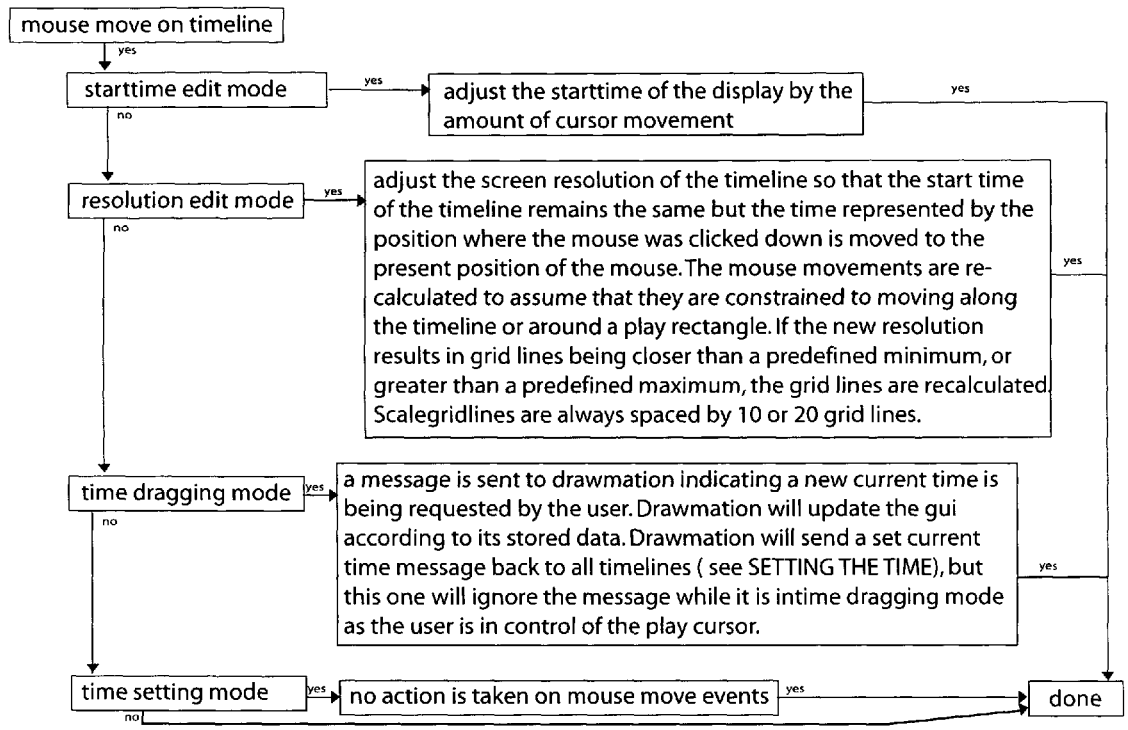

FIG. 20, a Flow chart titled "Move mouse on timeline" explains the conditions for a mouse being moved on a timeline. The definitions are used in this flow chart:

Start time edit mode: the mode where the value of the time at the beginning of the visible part of the timeline is adjusted by the amount that you move the mouse;

Resolution edit mode: This is the mode where the value of the time at the beginning of the visible part of timeline remains constant and the time at the mouse cursor point also remains constant, and the screen resolution is adjusted to meet those two criteria as you drag the mouse along the timeline. The is caused by clicking and dragging on either a text label or a scale gridline.

Time dragging mode:This is a mode where the current Drawmation time is set by the position of the mouse. This is caused by dragging the play cursor along the timeline with the mouse.

Time setting mode: This is the mode where The Drawmation position jumps to where the mouse has been clicked on the Gray Bar. This has a side effect that this action sets the replay start time to the point that is clicked on the Gray Bar by the mouse.

The routine begins by determining if the system is in the start time edit mode? If yes, adjust the start time of the display by the amount of cursor movement and the process is done. If no, then are is it in the resolution edit mode? If yes, then adjust the screen resolution of the timeline so that the start time of the timeline remains the same but the time represented by the position where the mouse was clicked down is moved to the present position of the mouse. The mouse movements are recalculated to assume that they are constrained to moving along the timeline or around a play rectangle. If the new resolution results in grid lines being closer than a predefined minimum, or greater than a predefined maximum, the grid lines are recalculated. Scale gridlines are always spaced by 10 or 20 grid lines. Following this the process is done.

If no, then are we in the time dragging mode? If yes, then a message is sent to Drawmation indicating a new current time is being requested by the user. Drawmation will update the GUI according to its stored data. Drawmation will send a set current time message back to all timelines (see SETTING THE TIME), but this one will ignore the message while it is in time dragging mode as the user is in control of the play cursor. Following this the process is done. If no, then are we in the time setting mode? If yes, no action is taken on mouse move events. Following this the process is done.

Figure 21:
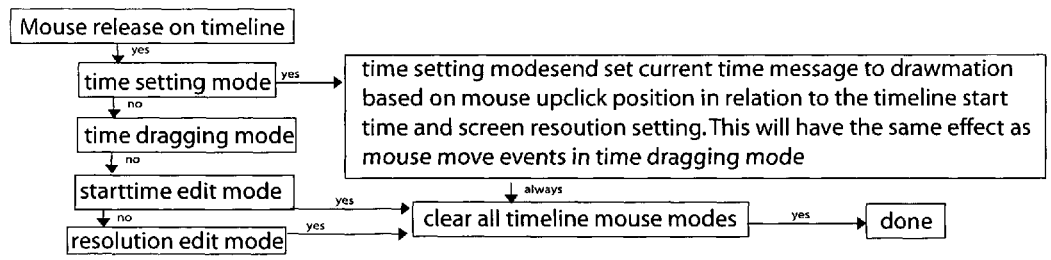

In FIG. 21, the Flow chart "Mouse release on timeline" begins by determining if a mouse upclick occurred? If yes, is the system in the time setting mode? If yes, then send set current time message to Drawmation based on mouse upclick position in relation to the timeline beginning and screen resolution setting. This will have the same effect as mouse move events in time dragging mode. The point where the mouse cursor is when it is up-clicked will set the play cursor start time. If no, then is the system in the time dragging mode? If yes, then send set current time message to Drawmation based on mouse upclick position in relation to the timeline start time and screen resolution setting. This will have the same effect as mouse move events in time dragging mode. Always, clear all timeline mouse modes and the process is done.

In FIG. 22, the flow chart "Setting the time" details the control of all real time aspects of blackspace. Whenever drawmation determines that the current time has changed, it sends a "set current time" message to all the timelines which exist in the GUI. Each timeline responds in its own fashion. In this discussion "timespan" refers to the amount of time which is displayed on a timeline, e,g., from 10 seconds to 20 seconds and a "page" refers to a particular timespan. Using this example, going to the "next page" would mean changing the timespan to 20-30 seconds.

The routine begins with a command to set current time A message has been received from Drawmation saying set the time to a certain value. This is the current time of the playback of the Drawmation. This time is measured from the beginning of the timeline to the current playback time. If one is playing a Drawmation, this time is how far into the Drawmation they are. This message is coming out every 30 ms or so regarding the current time of playback. The timeline is being told to set its current time to each new value being received from Drawmation. Then is time parameter box for play cursor visible? The time parameter box referred to here is item 15 of FIG. 5. If yes, then set parameter box to show the new time. Then is new time past the end of the current timespan? This means is the new time past the end of the visible area of the current timeline display? If yes, then ignore boundaries? If yes, then hide the play cursor and the process is done. This means the play cursor would play off the end of the timeline and nothing would change. If no, then query the scrolling mode. This means are we in the scrolling mode? Scrolling mode indicates that instead of the play cursor moving across the screen, the timeline itself would move across the screen and the play cursor would remain stationary. If yes, then move the current time span by the difference between the new time and the most recent time setting. Instead of moving the play cursor the start time of the timeline would move. So that the time line would move and the play cursor would remain stationary.

If no, then move the time span to the next page. In other words, reposition the timeline to show the next period of time that equals the current length of time that will fit on the timeline. Then this whole process starts over again. Referring again to is new time before the start of the current time span? If yes, then ignore boundaries. If yes, then hide the play cursor and the process is done. Referring to ignore boundary, if no, then are we in the scrolling mode? If yes, then move the current time span by the difference between the new time and the most recent time setting and this reiterates. If no, then move the time span to the previous page and the process reiterates. Referring again to is new time before the start of the current timespan?, if no, then is the play cursor visible? If yes, then move the play cursor to its correct position calculated from the new time, the current timespan and the current timeline resolution and the process is done. If no, then show the play cursor and then move the play cursor to its correct position calculated from the new time, the current timespan and the current timeline resolution and the process is done.

The flow chart of FIG. 23 describes what happens when an object is clicked on and held for a designated period of time and then a copy of that object is automatically made. This method enables users to duplicate objects without a keyboard. They click and hold for a time period and then drag away a copy of the object they clicked on. The copy routine begins when a Mouse press on object occurs, then start copy timer. In approximately one second a time event is generated when the timer times out. Then, make a note of which object was clicked on and exit. Continuing with this process a timer event is received and a copy is made. Timer event from copy timer is received, then set copy mode on and set "hand" cursor, then exit. This is the final step of dragging away a copy of the object that was clicked and held on for one second. Mouse move on object, if yes, then is copy mode on, if yes then, set copy mode off and clear "hand" cursor and the process is done. If no, exit.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. In a computer system having a display, a method for playing media files, comprising the steps of: providing a play rectangle on the display, said play rectangle having a continuous rectangular perimeter formed as a continuous time line, dragging a media object associated with a media file to the play rectangle, and in response to dropping the media object in the play rectangle, playing the media file.

2. The method of claim 1, further including providing a play cursor on the time line, and clicking and dragging on the play cursor in a first direction to play the media and set the playback speed.

3. The method of claim 2, further including clicking and dragging on the play cursor in a second direction opposite the first direction to play the media backwards.

4. The method of claim 1, further including the step of clicking on the time line to create a play cursor at the click point.

5. The method of claim 1, further including gridlines spaced along said time line to demarcate units of a parameter.

6. The method of claim 5, wherein said parameter units represent time.

7. The method of claim 5, wherein said parameter units represent onscreen distance and length.

8. The method of claim 5, further comprising the step of clicking and dragging on said gridlines to rescale said timeline.

9. The method of claim 5, wherein said gridlines include scale lines at regular intervals among said gridlines.

10. The method of claim 9, further comprising the step of providing alphanumeric labels for said scale lines.

* * * * *